(No Model.)

J. W. EASTON.
SELF EXCITING ALTERNATE CURRENT ELECTRIC GENERATOR.

No. 363,126. Patented May 17, 1887.

Witnesses
Geo. W. Breck
Carrie E. Ashley

Inventor
James W. Easton,
By his Attorneys
Pope & Edgecomb

UNITED STATES PATENT OFFICE.

JAMES W. EASTON, OF NEW YORK, N. Y.

SELF-EXCITING ALTERNATE-CURRENT ELECTRIC GENERATOR.

SPECIFICATION forming part of Letters Patent No. 363,126, dated May 17, 1887.

Application filed July 3, 1886. Serial No. 207,013. (No model.)

*To all whom it may concern:*

Be it known that I, JAMES W. EASTON, a subject of the Queen of Great Britain, residing in New York, in the county and State of New York, have invented certain new and useful Improvements in Self-Exciting Alternate-Current Electric Generators, of which the following is a specification.

The invention relates to the construction and organization of circuits for causing an alternate-current generator to maintain its own field of force.

It is usual in constructing alternate-current generators either to maintain the fields by means of permanent magnets or else to employ electro-magnets whose coils are traversed by currents from an independent generator.

The object of my invention is to provide means for causing the field of force to be maintained by means of currents derived from the armature itself, and at the same time to employ alternating currents for operating the translating device in a work-circuit in the usual manner.

The invention consists, in general terms, in utilizing each successive current of a given polarity, in magnetizing the field-magnets, and in causing a shunt-circuit to be established upon the field-magnet coils during the transmission of the currents of opposite polarity.

It is well known that an electric magnet, after having been magnetized, requires a certain length of time for discharge, and if the terminals of its coils be connected through a circuit of little or no resistance the time required is correspondingly greater. For practical purposes, therefore, the field-magnets will not become sufficiently discharged during the intervals which elapse between the transmission of two currents of the same polarity to materially diminish the field of force of the generator. The invention is applicable to both series and shunt-wound machines, and will be described in connection with both classes.

Figure 2:
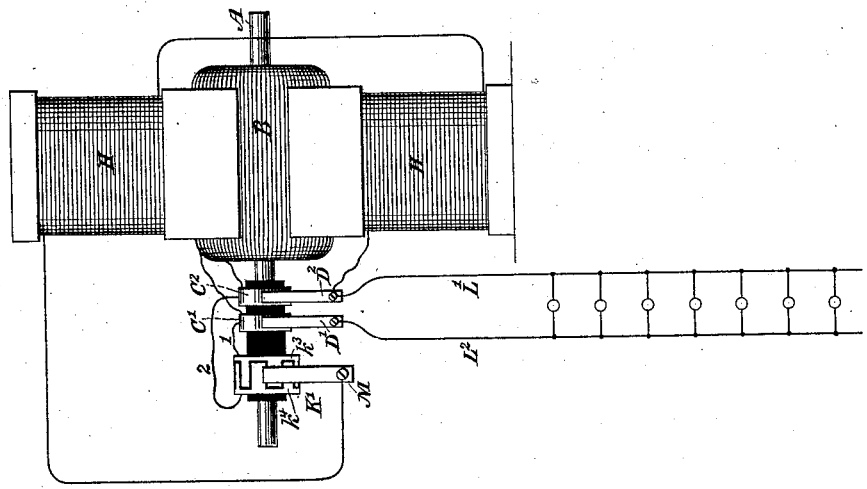
Figure 1:
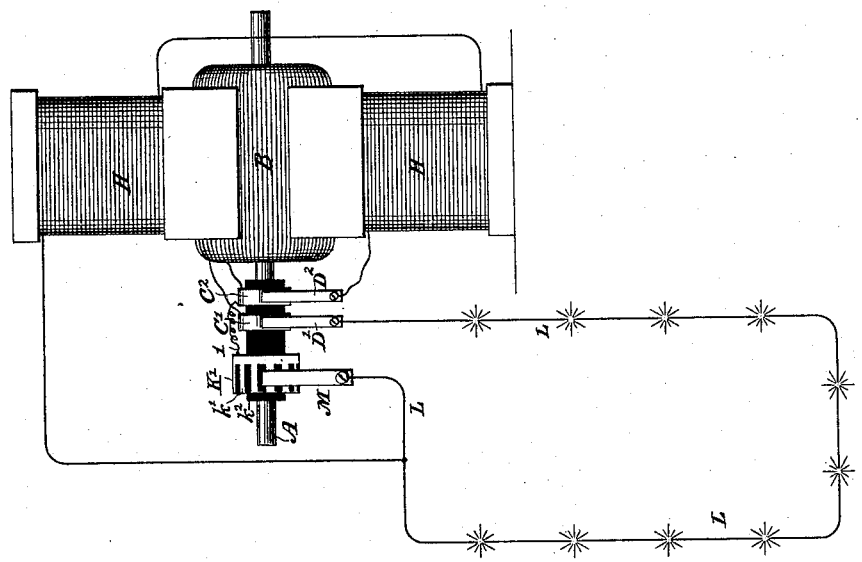

In the accompanying drawings, Figure 1 is a diagram illustrating the application of the invention to a series machine, and Fig. 2 illustrates its application to a shunt-wound machine.

Referring to the figures, A represents the shaft of an electric generator, and B the armature. The terminals of the coils of the armature are connected with two contact plates or rings, $C'$ and $C^2$, and the currents are taken from these two rings by brushes $D'$ and $D^2$. The brushes are connected with each other through the coils H of the field-magnets. It is desired, however, that each alternate current should be shunted around the field-magnet coils, and this is accomplished by means of a circuit-controlling device, $K'$, carried upon the shaft of the generator. It consists of a series of contact-plates, $k'$ $k'$, electrically connected with each other and by conductor 1 with the contact-ring $C^2$. A contact-brush, M, is applied to the series of plates $k'$, and the parts are so organized that each positive or each negative current, as desired, will find the circuit closed through the conductor 1, a plate, $k'$, and the brush M, which is connected with the terminals of the coils of the field-magnet opposite from the brush $D^2$. Each alternate current—say each negative current, for instance—from the armature will thus find its circuit complete from one contact-brush, $D'$, to the other, $D^2$, through the work-circuit L, independently of the field-magnet coils H. When the shaft, however, has advanced a sufficient distance to produce a reverse current, then the plate $k'$ will have passed from beneath the brush M, and an insulated section, $k^2$, will be in contact with the brush M, and the current from the armature will be forced to traverse the field-magnet coils H. Each positive current, therefore, will find its path through the field-magnet coils, and these serve to maintain the field-magnet vitalized. During the transmission of the negative currents, a shunt-circuit of practically no resistance being closed from one terminal to the other of the field-magnet coils, the latter will discharge slowly, and before the magnetism produced by one positive current through the field-magnet coils has disappeared another current of the same polarity will be sent through the coils. These impulses will occur with sufficient frequency to maintain the fields charged.

In Fig. 2 the invention is illustrated as applied to a shunt-wound machine. The parts are organized in substantially the same manner as in Fig. 1, with the exception that the work-circuit $L'$ $L^2$ is in a shunt around the field-magnet coils H, and means are provided for establishing a shunt-circuit around the field-coils, consisting of a device, $K'$, having alternate plates $k^3$, connected, as before, through conductor 1, with the plate C', while intermediate contact-plates, $k^4$, are connected with each other and, by means of the conductor 2, with the other contact-plate, $C^2$. The revolution of the shaft will cause the contact-brush M to be in contact with the plates $k^3$ and $k^4$ alternately. When in contact with the plates $k^4$, a circuit will be completed from the brush $D^2$, through the field-magnet coils H, to the brush M, thence through the contact-plate $k^4$ and through the conductor 2 to the plate $C^2$, thus connecting the terminals of the field-magnet coils. When the brush M is in contact with a plate, $k^3$, then the circuit between the brush M and the conductor 2 will be interrupted, and the circuit through the coils H will be established through the plate C', conductor 1, plate $k^3$, and brush M, thereby placing the field-magnet coils in circuit.

I claim as my invention—

1. In an alternate current electric generator, the combination, with the armature-coils, of the field-magnet coils having one terminal permanently connected with one terminal of the armature-coils, and a circuit-controller connecting the remaining terminal of the field-magnet coils directly with the remaining terminal of the armature-coils during the generation of currents of a given polarity and interrupting said connection during the generation of currents of the opposite polarity, and at the same time connecting the terminals of the field-magnet coils directly with each other.

2. In an alternate-current electric generator, the combination of an armature, two contact-rings upon the shaft carrying said armature, with which the respective terminals of the armature-coils are connected, contact-brushes applied to the respective contact-rings, a work-circuit connected between said brushes, a circuit-controller upon said shaft, consisting of two insulated segments, respectively connected with said contact-rings, a brush making contact with the segments alternately, a connection from said brush with one terminal of the field-magnet coils, and a connection from the other terminal with one of the first-named brushes.

In testimony whereof I have hereunto subscribed my name this 25th day of May, A. D. 1886.

JAMES W. EASTON.

Witnesses:
   THOS. TRYON,
   CHARLES A. TERRY.